United States Patent [19]

Mowill

[11] Patent Number: 4,530,639
[45] Date of Patent: Jul. 23, 1985

[54] DUAL-ENTRY CENTRIFUGAL COMPRESSOR

[75] Inventor: Rolf J. Mowill, Oslo, Norway

[73] Assignee: A/S Kongsberg Vapenfabrikk, Norway

[21] Appl. No.: 577,359

[22] Filed: Feb. 6, 1984

[51] Int. Cl.³ .......................... F01D 3/02; F04D 29/38
[52] U.S. Cl. ...................................... 415/98; 415/102; 415/211; 416/184
[58] Field of Search .......................... 415/98, 102, 211; 416/183, 184, 199, 200 R, 200 A

[56] References Cited

U.S. PATENT DOCUMENTS

| | | | |
|---|---|---|---|
| 1,250,005 | 12/1917 | Phillips | 415/98 |
| 1,602,008 | 10/1926 | Germeyer | 415/98 |
| 1,674,543 | 6/1928 | Clifton | 416/184 |
| 2,438,426 | 3/1948 | Whittle | 415/98 |
| 2,465,671 | 3/1949 | Van Millingen et al. | 416/184 |
| 3,430,921 | 3/1969 | Dewey | 415/98 |
| 3,625,003 | 12/1971 | Liddle et al. | 415/151 |
| 3,642,062 | 2/1972 | Edmaier et al. | 415/98 |
| 3,953,150 | 4/1976 | Onal | 416/199 |

FOREIGN PATENT DOCUMENTS 16820 7/1956 Fed. Rep. of Germany ...... 416/184

OTHER PUBLICATIONS

Johnson, D. and Mowill, R. J., "Aegidius Elling—A Norwegian Gas Turbine Pioneer", Norsk Teknisk Museum, Oslo 1968.
Mowill, R. J. and Strom, S., "New Radial Engine Technology from Kongsburg", ASME, 83-Gt-221, Mar. 1983.
Thomassen Holland b.N. publication.
AiResearch GT-85 publication.

Primary Examiner—Robert E. Garrett
Assistant Examiner—H. Edward Li
Attorney, Agent, or Firm—Finnegan, Henderson, Farabow, Garrett & Dunner

[57] ABSTRACT

The improved dual-entry radial compressor rotor of the present invention has two sets of alternating full length and partial length blades on a symmetrical hub, with the partial length blades on one hub side terminating at the rotor high velocity exit coincident with the full length blades on the other hub side, to smooth the gas velocity profile in the tangential direction. Aerodynamically shaped sawtooth-profiled reliefs are provided in the hub radial portion between the blade tips to allow induced pressure differentials between the flow paths to smooth the axial velocity profile.

10 Claims, 7 Drawing Figures

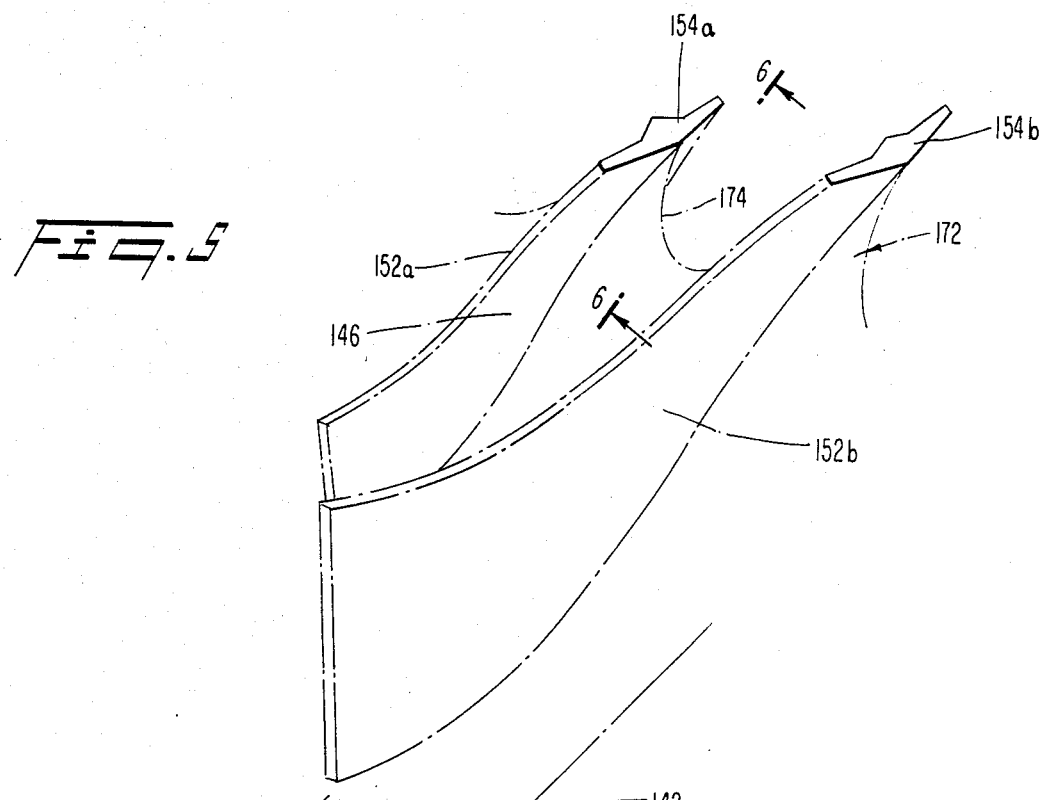
Fig. 5
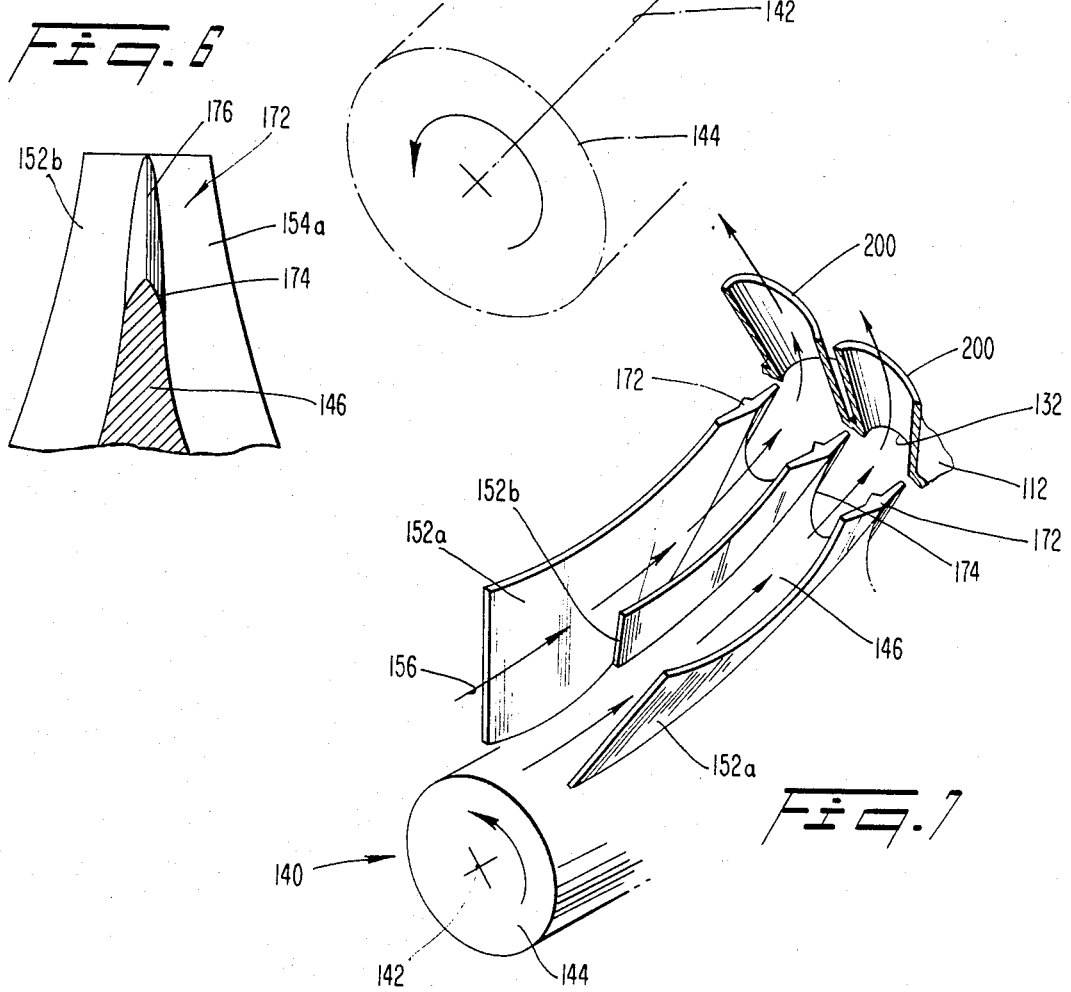
Fig. 6
Fig. 7

DUAL-ENTRY CENTRIFUGAL COMPRESSOR

BACKGROUND OF THE INVENTION

1. Field of the Invention

This invention relates to improvements in the impeller/rotor component of a dual-entry, high performance centrifugal compressor.

2. Description of the Prior Art

Dual-entry, single exit centrifugal compressors per se are known in the art. See, for instance U.S. Pat. No. 2,438,426 to Whittle; Johnson, D. and Mowill, R. J. "Aegidius Elling—A Norwegian Gas Turbine Pioneer," Norsk Teknisk Museum pub., Oslo 1968 at FIG. 11. The impeller or rotor component of such compressors typically has a hub with a centrally located, full radius portion flanked by portions of decreasing radius extending to either side of the central portion. Rotor blades for accelerating and compressing the working gas are typically mounted on either side of the full radius central portion of the hub, and are configured to provide a generally decreasing height dimension for the twin gas flow paths established between the rotor hub and the surrounding housing. It is also known to arrange the blades in a spiral, helical fashion when viewed in the direction of the axis of rotation of the hub. See Mowill, R. J. and Strom, S., "New Radial Engine Technology from Kongsberg," ASME pub. 83-GT-221, at FIG. 4.

In typical single entry and dual-entry centrifugal compressors, the rotor blades extend along the entire length of the respective flow path, that is, from the respective rotor axial inlet to the exit at the radial extremity of the central full radius hub portion. It is also known in the design of single and dual-entry centrifugal compressors to utilize one or more additional sets of blades which extend along only a part of the gas flow path, that is, from an intermediate point along the flow path to the compressor rotor exit. These partial length blades generally are positioned in alternating relation with the full length blades about the periphery of the rotor and are intended to assume part of the aerodynamic loading in the vicinity of the outer periphery of the rotor.

Problems that can arise in the utilization of current dual-entry rotor designs in applications calling for a pressure ratio (P exit/P inlet) greater than about 5:1, stem from the effect of variations in the velocity profile of the gas exiting the rotor on the efficiency of the diffuser component of the compressor. In particular, the velocity profile in the axial direction can include a pronounced depression coincident with the full radius central portion of the rotor hub.

The axial velocity profile can also be biased to one or the other rotor side due to different ambient conditions (e.g. pressure, temperature) upstream of the respective rotor axial inlet, which can cause a further decrease in diffuser efficiency.

In conventional high performance single and dual-entry rotors of the type using alternating full length and partial length blades, velocity profile variations can also occur in the tangential direction. The velocity profile would tend to exhibit a series of evenly spaced depressions about the rotor periphery coincident with the locations of the partial length impeller vanes. This profile is a consequence of the uneven division of the gas flow on each side of the partial length blades, for an even blade spacing (i.e. equal flow path cross-sectional flow areas).

These variations in the velocity profiles can have the effect of decreased diffuser component efficiency. While the aforementioned variations in the velocity profile of prior art compressor rotors can be expected to adversely affect the performance of all diffuser types, the performance penalties would be especially severe for closely coupled pipe-type diffusers, that is, pipe diffusers positioned closely adjacent the rotor blade tips.

SUMMARY OF THE INVENTION

It is a specific object of the present invention to minimize variations in the axial and tangential velocity profiles of the gas leaving a dual-entry centrifugal compressor to provide an even velocity profile into the downstream diffuser component. The conditioning or preparation of the high velocity gas in respect to velocity profile that occurs with the present invention is considered to be important from the standpoint of providing increased overall efficiency and increased mass flow rate operating.

The present invention achieves this object by providing an arrangement of full length and partial length blades on each side of a dual-entry rotor with the positions staggered to achieve termination of each full length blade on one side with a partial length vane on the other rotor side at the high velocity outlet. The averaging at a given tangential location of the high and low compressed gas flow rates from the full length and partial length blades on opposite sides of the hub serves to minimize the variations in the tangential direction. The gas velocity profile axial variations are minimized by providing, in conjunction with the staggered blade arrangement, scallop-type reliefs in the central hub portion between terminating blades to allow mixing of the gas streams from opposing rotor sides prior to exiting the compressor.

More specifically, and in accordance with the present invention, as embodied and broadly described herein, the improved high performance centrifugal compressor of this invention being of the type having a rotor with a pair of opposing axially directed inlets and a common, radially directed outlet, the compressor rotor having an integral, axisymmetric hub with a central, full radius portion and two tapering flanking portions, the hub defining, in part, twin flow paths through the compressor rotor, comprises two sets of full length compressor blades mounted on the hub, the individual blades of each full length blade set extending along substantially the entire length of a respective one of the twin flow paths between the respective inlet and the outlet; at least two sets of partial length compressor blades mounted on the hub, the individual blades of each partial length blade set extending along only the portion of a respective one of the twin flow paths proximate the high velocity radial outlet, the individual blades of the full length blade set and the partial length blade set in each flow path being positioned in alternating relation about the rotor circumference; and means for reducing variations in the velocity profile of the high velocity gas exiting the radial outlet, the means including a positioning about the rotor circumference of the individual blades of the full length blade set in one flow path to terminate at the high velocity radial outlet coincident with the individual blades of the partial length blade set in the other flow path.

Further in accordance with the present invention, the compressor includes closely-coupled pipe-type diffusers arranged to receive high velocity gas from the compressor rotor outlet, and the velocity variation reducing means further includes reliefs formed in the portions of the full radius portion of the hub separating the twin flow paths at the high pressure radial outlet.

The accompanying drawing, which is incorporated in and constitutes a part of this specification, illustrates one embodiment of the invention and, together with the description, serves to explain the principles of the invention.

BRIEF DESCRIPTION OF THE DRAWING

FIG. 5 is a different perspective view of a detail of the rotor shown in FIG. 4;

FIG. 6 is a further detail of the rotor shown in FIG. 4; and

FIG. 7 is a schematic representation of a portion of the rotor shown in FIG. 4 used in conjunction with a closely-coupled pipe-type diffuser.

Figure 1:
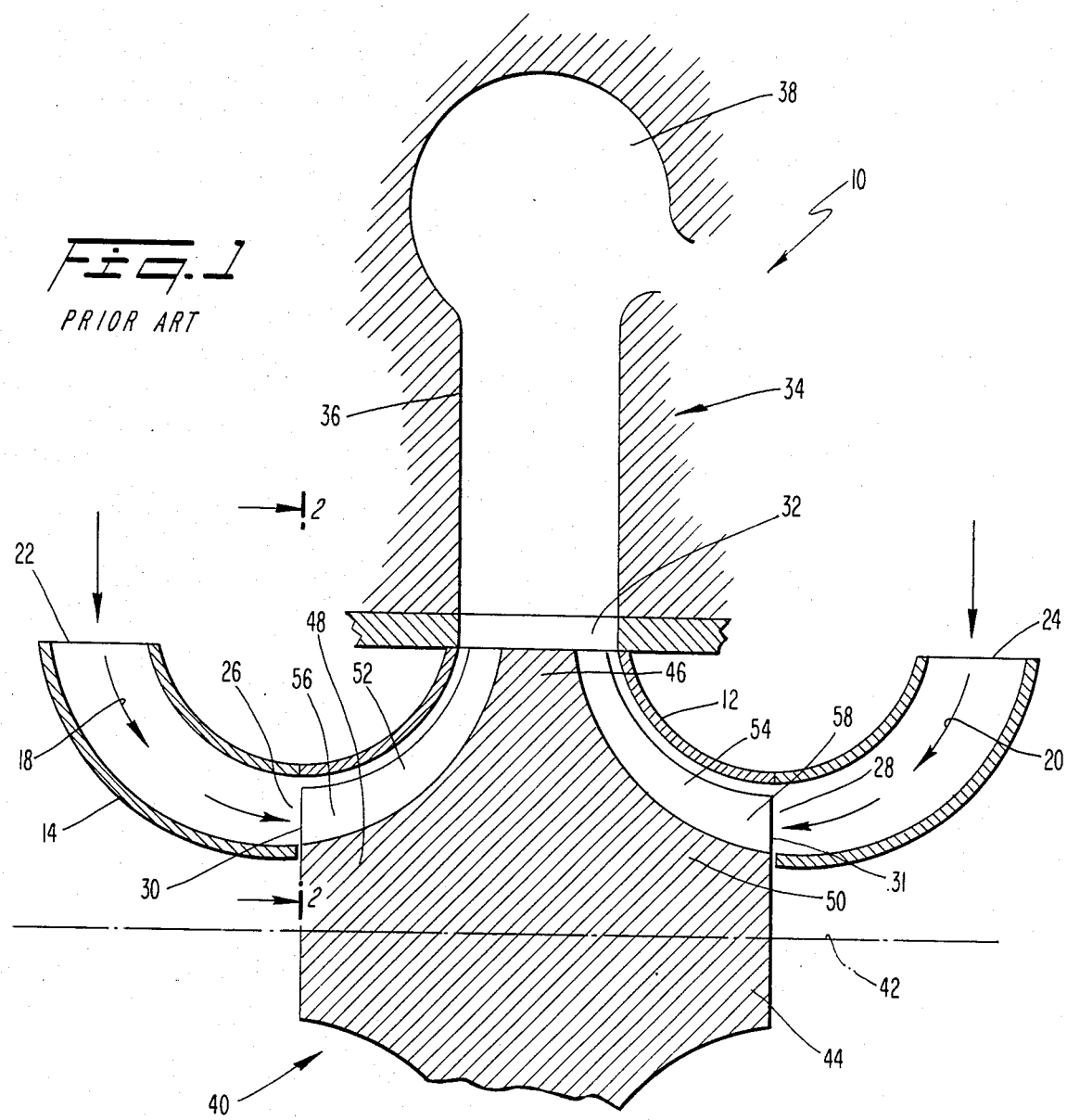
FIG. 1 is a schematic cross-sectional side view of a prior art dual-entry compressor rotor and associated housing shown being used with a channel-type diffuser.

Reference will now be made in detail to the present preferred embodiment of the invention, an example of which is illustrated in the accompanying drawing.

DESCRIPTION OF THE PREFERRED EMBODIMENT

For the purpose of illustrating the preferred embodiment of the improved compressor rotor of the present invention, reference first will be made to FIG. 1 which illustrates a conventional dual-entry compressor. With respect to FIG. 1, dual-entry centrifugal compressor shown generally as 10 includes an impeller/rotor housing 12 with a pair of opposing, axially connected ducts 14, 16 for admitting the gas to be compressed, such as ambient air. Ducts 14, 16 are of a flared annular configuration and define a pair of flow paths for the gas designated by the arrows 18, 20, respectively. The geometry of ducts 14, 16 provides a decreasing cross-sectional flow area along the length and a turning of the direction of the gas stream from predominantly radial at the duct entrances 22, 24 to predominantly axial at the duct exits 26, 28 respectively. Control vanes (not shown) can be provided in the ducts to control the degree of swirl of the incoming gas to match the angle of attack of the compressor rotor blades.

With continued reference to FIG. 1, rotor housing 12 contains a rotor 40 having a pair of annular inlets 30, 31 in communication with duct exits 26, 28, respectively and a single outlet 32 for the high velocity gas. From outlet 32, the high velocity gas passes into diffuser chamber 34, which is flow connected to housing 12, where the velocity of the gas is decreased and the pressure increased according to principles well known in the art. Diffuser 34, which is of the annular channel type, has a straight wall annular portion 36 and a ring-shaped manifold collector portion 38 for collecting and channeling the diffused high pressure gas.

Still with reference to FIG. 1, compressor rotor 40 is mounted for high speed rotation about axis 42. Rotor 40 has a hub portion 44 having a central, full radius portion 46 and a pair of symmetrical, decreasing radius portions 48, 50 positioned on opposing sides of full radius portion 46. Mounted on hub portions 48, 50 are identical blade sets 52, 54. The individual blades of blade sets 52, 54 extend the full length of the twin flow paths 56, 58, that is, from rotor inlets 30, 31 to outlet 32. Rotor 40 can also be conventionally supplied with partial length blades (not shown in FIG. 1) positioned between the full length blades. These typically extend along the portion of the flow path proximate the outlet and are intended to absorb some of the aerodynamic load of the accelerating gas stream.

Figure 2:
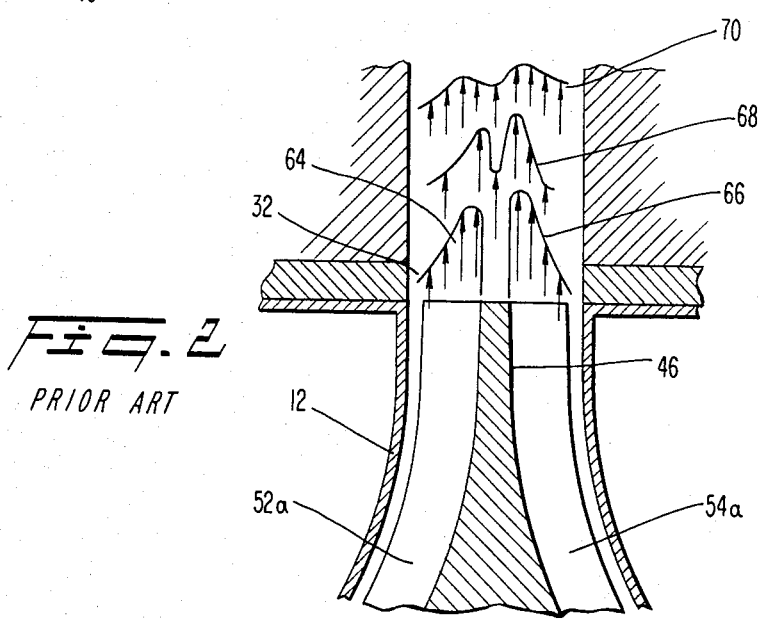
FIG. 2 is a schematic representation of the axial velocity profile of the gas exiting the rotor of FIG. 1.

FIG. 2 shows the consequence of the prior art design of rotor 40 wherein a central full radius portion 46 is utilized and wherein differences exist in the conditions of the gas supplied from ducts 14, 16. The gas velocity profile immediately downstream the tips of vanes 52, 54 exhibits twin peaks in the axial direction which peaks also are not of the same magnitude due to biasing, as represented by the arrow fields 64, 66. Although downstream mixing tends to even out the peaks, as suggested by successive arrow fields 68 and 70 in FIG. 2, the construction of conventional dual-entry rotors 40 has the effect of delaying attainment of fully developed velocity profile until a significant distance downstream with the attendant decrease in diffuser efficiency. There is also the possibility of vortex shedding and eddy formation in the region immediately downstream of the radial tip of hub portion 46 and a resulting further decrease in diffuser efficiency.

Figure 3:
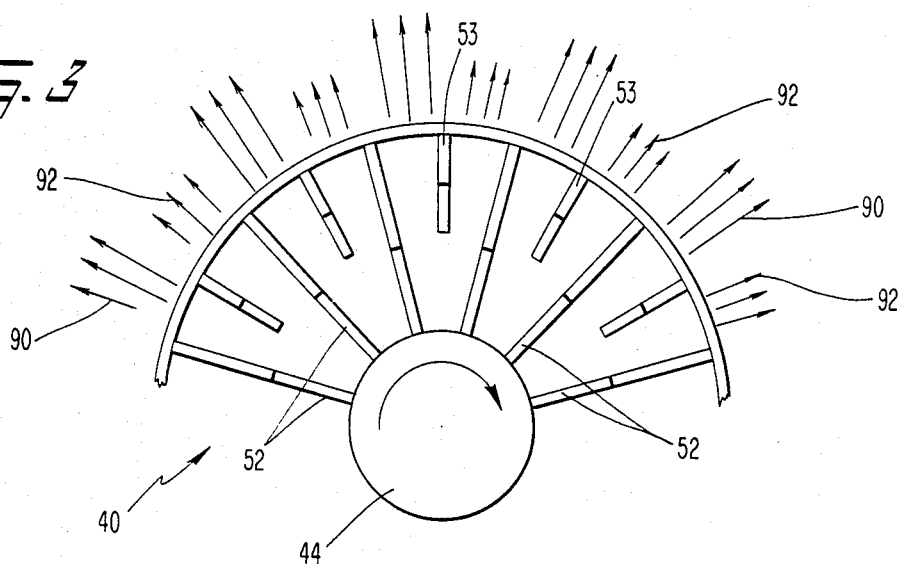
FIG. 3 is a cross-sectional end view of the rotor of FIG. 1 showing the tangential velocity profile of the exiting gas.

FIG. 3 illustrates the flow pattern of the high velocity gas exiting a dual-entry rotor 40 provided with alternating full length blades 52 and partial length blades 53. In the tangential direction, as shown in FIG. 3, velocities of the gas exiting in front of the full length vanes 52 (velocities represented by arrows 90) tend to be higher than the average velocity of the gas exiting in front of the partial length blades 53 (represented by arrows 92), with respect to the intended direction of rotation. This is a consequence of the uneven gas mass flow split in the path between the full length blades 52. Inertial considerations suggest that more gas would tend to "hug" the leading face of the full length blades 52. As a result, a non-uniform gas velocity profile exists in the tangential direction. This profile tends to even out downstream in the diffuser (not shown in FIG. 3) as a consequence of the mixing between the gas streams from successive full length and partial length blades, but the effect of the uneven flow split is to delay the point at which a fully developed profile is obtained.

In accordance with the present invention, an improved dualentry centrifugal compressor rotor is provided with velocity profile variation reducing means including alternating full length and partial length blades positioned about the periphery of both tapering sides of a rotor hub having a central, full radius portion. A specific staggered positioning about the rotor periphery of the individual full length blades on one side of the full radius hub portion relative to the position of the full length blades on the other hub side is the means by which variations in the tangential velocity profile are minimized. Full length blades on one rotor side terminate in common with the partial length blades on the other rotor side, and vice versa. As embodied herein and depicted schematically in FIG. 4, an improved rotor of the present invention designated generally 140 is rotatable about axis 142 in an appropriate housing (not shown). Rotor 140 has hub 144 with a central, full radius portion 146 and flanking sections 148, 150 having radii decreasing with increasing axial distance from portion 146. On hub portion 148 are mounted alternating full length and partial length blades 152a and 152b, respectively, and corresponding alternating blades 154a and 154b are positioned on hub portion 150.

Importantly, and in accordance with the present invention, the corresponding blade sets are distributed tangentially such that the full length blades 152a on hub portion 148 terminate at the compressor rotor outlet coincident with the termination of partial length blades 154b on hub portion 150. In this manner, the reduced gas flow rate and lower velocities exiting ahead of the partial length blades on one rotor side (e.g. the shorter length arrow in path 158 of FIG. 4) are augmented by the increased flow rates and gas velocities ahead of the full length blades on the other rotor side (e.g. longer length arrow in path 156), with respect to the intended direction of rotation. A similar averaging occurs in the adjacent converging flow channels but with the magnitudes of the contributions reversed. This averaging is expected to reduce the amplitude of the tangential gas velocity variations and thereby improve diffuser efficiency.

Figure 4:
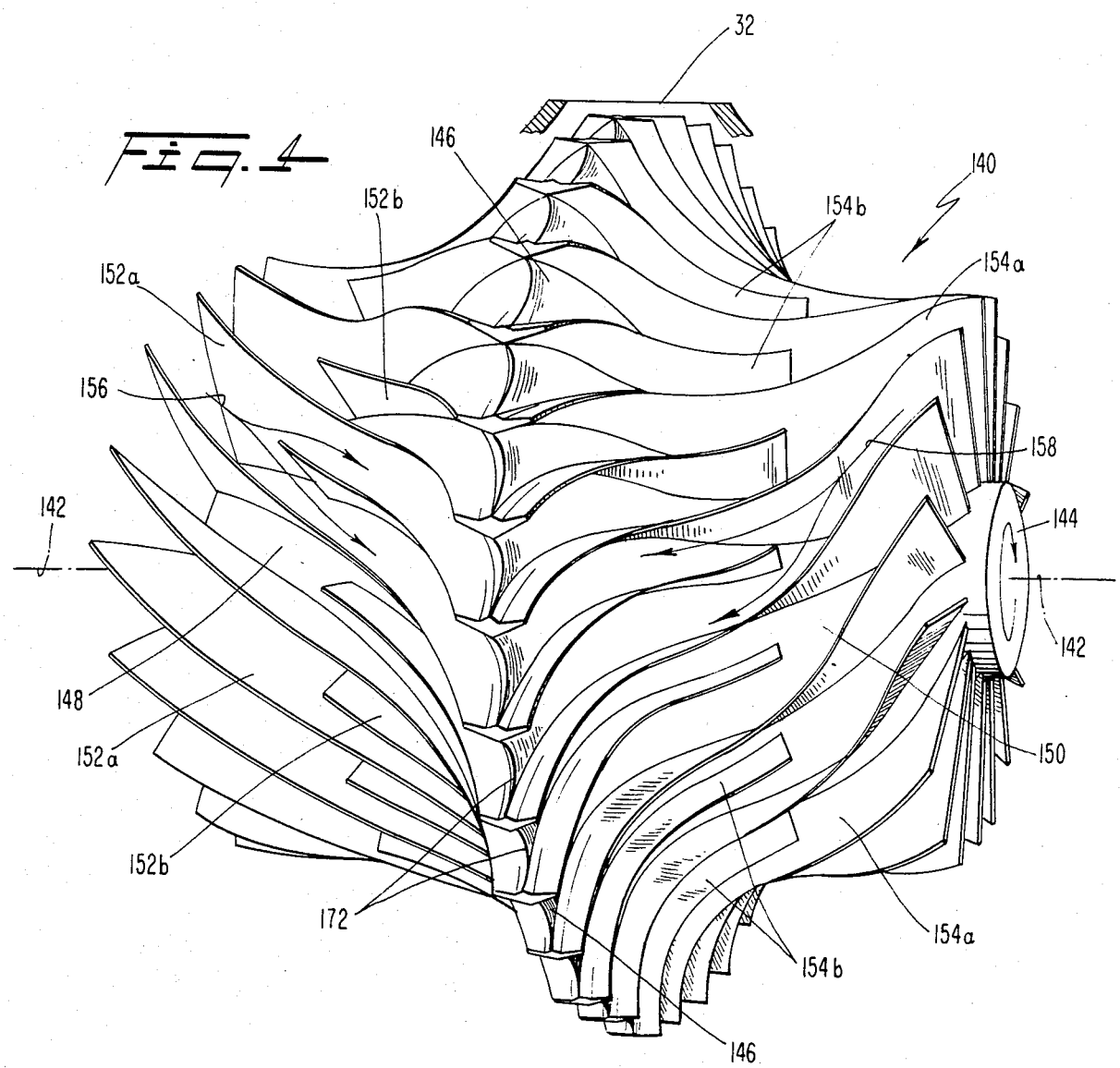
FIG. 4 is a perspective view of an embodiment of the improved dual-entry compressor rotor of the present invention.

Also in accordance with the present invention, reliefs are formed in the portions of the full radius hub portion separating the twin flow paths in the vicinity of the compressor outlet. These reliefs are intended to permit initial mixing of the separate gas streams from opposing flow paths at a point upstream of the compressor rotor outlet. As embodied herein, and as best seen in FIGS. 4-6, scallop-type reliefs 172 are provided in the full radius hub portion 146 between each pair of terminating blades 152a/154b and 152b/154a. In this manner, the gas flow in opposing flow paths 156 and 158 can join and begin mixing upstream of rotor outlet 32 and thus provide a more fully developed velocity profile at the entrance to the diffuser component.

Moreover, the turbulence created by the uneven flow contributions due to the staggered blade arrangement is expected to induce a net gas flow across the hub central portion to diminish any bias resulting from dissimilar rotor inlet flow conditions, as discussed previously. The ability to provide reliefs 172 in the hub portion 146 and yet retain sufficient structural support for the tips of the vanes 152 and 154 is a further consequence of the positioning feature of the present invention, which causes blades on opposing sides of the rotor to terminate at the same tangential location and thus provide mutual support, and of the "sawtooth" tangential relief profile wherein the parts of the central hub portion immediately adjacent the blade tips are retained. As shown in FIG. 6, it is further preferred that the reliefs 172 are accomplished such that the remaining edges 174 of relieved hub portion 146 are aerodynamically shaped. Edges 174 can be made assymmetrical in the tangential direction to provide additional support behind the blade tips in the rotational direction, as depicted in FIG. 6 by edge portion 176.

It is specifically contemplated that the improved rotor 140 of the present invention is also usable in a compressor having a closely-coupled pipe-type diffuser instead of the annulusmanifold type diffuser shown in FIG. 1. As depicted schematically in FIG. 7, a series of such pipe diffusers 200 each having an increasing cross-sectional flow area is arranged about the periphery of rotor housing 112 near the rotor outlet 132. Pipe diffusers 200 are disposed obliquely near tangentially about the circumference to receive the high velocity gas from flow paths 156 and 158. The ovular inlets for the individual pipe diffusers would overlap in practice but are shown circumferentially spaced in FIG. 7 for clarity. Closely-coupled pipe diffusers 200 are more sensitive to non-fully developed velocity profiles, and compressor-diffuser assemblies using such diffuser components are expected to benefit substantially from the employment of the improved dual-entry compressor rotor of the present invention.

It will be apparent to those skilled in the art that various modifications and variations could be made in the compressor rotors of the present invention without departing from the scope or spirit of the invention.

What is claimed is:

1. An improved high performance centrifugal compressor of the type having a rotor with a pair of opposing axially directed low velocity inlets and a common, radially directed high velocity outlet, the compressor rotor having an integral, axisymmetric hub with a central, full radius portion and two tapering flanking portions, the hub defining, in part, twin flow paths through the compressor, the improvement comprising:

two sets of full length compressor blades mounted on the hub, the individual blades of each full length blade set extending along substantially the entire length of a respective one of the twin flow paths between the respective inlet and the outlet;

at least two sets of partial length compressor blades mounted on the hub, the individual blades of each partial length blade set extending along only the portion of a respective one of the twin flow paths proximate the high pressure radial outlet, the individual blades of the full length blade set and the partial length blade set in each flow path being positioned in alternating relation about the rotor circumference; and means for reducing variations in the velocity profile of the high velocity gas exiting the radial outlet, said means including a positioning about the rotor circumference of the individual blades of the full length blade set in one flow path to terminate at the high velocity radial outlet coincident with the individual blades of the partial length blade set in the other flow path.

2. The improved compressor as in claim 1 wherein said coincident blades are integrally joined at their respective common termination points.

3. The improved compressor as in claim 1 wherein the blades of said full length blade sets and said partial length blade sets are mounted and configured to define flow channels which spiral about the hub axis.

4. An improved high performance centrifugal compressor of the type having a rotor with a pair of opposing axially directed low velocity inlets and a common, radially directed high velocity outlet, the compressor rotor having an integral, axisymmetric hub with a central, full radius portion and two tapering flanking portions, the hub defining, in part, twin flow paths through the compressor, the improvement comprising:

two sets of full length compressor blades mounted on the hub, the individual blades of each full length blade set extending along substantially the entire length of a respective one of the twin flow paths between the respective inlet and the outlet;

at least two sets of partial length compressor blades mounted on the hub, the individual blades of each partial length blade set extending along only the portion of a respective one of the twin flow paths proximate the high velocity radial outlet, the individual blades of the full length blade set and the partial length blade set in each flow path being positioned in alternating relation about the rotor circumference; and means for reducing variations in the velocity profile of the high velocity gas exiting the radial outlet, said means including a positioning about the rotor circumference of the individual blades of the full length blade set in one flow path to terminate at the high velocity radial outlet coincident with the individual blades of the partial length blade set in the other flow path, said velocity variation reducing means further including reliefs formed in portions of the hub separating the twin flow paths at the high velocity radial outlet for promoting initial mixing of the separate gas streams upstream of the outlet.

5. The improved high performance centrifugal compressor of claim 4 wherein the profile of the radially outermost edge of the relieved full radius portion is aerodynamically shaped.

6. The improved high performance centrifugal compressor of claim 4 wherein the profile of the radially outermost edge of the relieved full radius portion is a sawtooth, said sawtooth profile for retaining at least part of the portion of the full radius hub portion located immediately behind each pair of commonly terminating blades to provide blade tip support during operation.

7. An improved high performance centrifugal compressor of the type having a rotor with a pair of opposing axially directed low velocity inlets and a common, radially directed high velocity outlet, the compressor rotor having an integral, axisymmetric hub with a centrally located full radius portion and two tapering flanking portions, the hub defining, in part, twin flow paths through the compressor, the improvement comprising:

two sets of full length compressor blades mounted on the hub, the individual blades of each full length blade set extending along substantially the entire length of a respective one of the twin flow paths between the respective inlet and the outlet;

at least two sets of partial length compressor blades mounted on the hub, the individual blades of each partial length blade set extending along only the portion of a respective one of the twin flow paths proximate the high velocity radial outlet, the individual blades of the full length blade set and the partial length blade set in each flow path being positioned in alternating relation about the rotor circumference; and means for reducing variations in the velocity profile of the high velocity gas exiting the radial outlet, said means including a positioning about the rotor circumference of the individual blades of the full length blade set in one flow path to terminate at the high velocity radial outlet coincident with the individual blades of the partial length blade set in the other flow path; and the compressor further including pipe diffuser means operatively connected to receive the high velocity gas exiting the compressor rotor outlet.

8. The improved compressor as in claim 7 wherein said pipe diffuser means includes a plurality of individual pipe diffusers arrayed obliquely, near tangentially about the periphery of said compressor.

9. The improved compressor as in claim 7 wherein said velocity variation reducing means further includes aerodynamically shaped reliefs formed in portions of the full radius portion of the hub separating the twin flow paths at the high velocity radial outlet for promoting initial mixing of the separate gas streams upstream of the rotor outlet.

10. The improved high performance centrifugal compressor of claim 7 wherein the profile of the radially outermost edge of the relieved full radius portion is a sawtooth, said sawtooth profile for retaining at least part of the portion of the full radius hub portion located immediately behind each pair of commonly terminating blades to provide blade tip support during operation.

* * * * *